(12) United States Patent
Muramatsu et al.

(10) Patent No.: US 9,574,630 B2
(45) Date of Patent: Feb. 21, 2017

(54) ELECTRIC LINEAR MOTION ACTUATOR AND ELECTRIC DISK BRAKE SYSTEM

(71) Applicants: Makoto Muramatsu, Shizuoka (JP); Masaaki Eguchi, Shizuoka (JP); Tatsuya Yamasaki, Shizuoka (JP); Tomomi Goto, Shizuoka (JP)

(72) Inventors: Makoto Muramatsu, Shizuoka (JP); Masaaki Eguchi, Shizuoka (JP); Tatsuya Yamasaki, Shizuoka (JP); Tomomi Goto, Shizuoka (JP)

(73) Assignee: NTN Corporation, Osaka (JP)

(*) Notice: Subject to any disclaimer, the term of this patent is extended or adjusted under 35 U.S.C. 154(b) by 0 days.

(21) Appl. No.: 14/878,001

(22) Filed: Oct. 8, 2015

(65) Prior Publication Data
US 2016/0025170 A1 Jan. 28, 2016

Related U.S. Application Data

(63) Continuation of application No. 13/821,243, filed as application No. PCT/JP2011/069735 on Aug. 31, 2011, now Pat. No. 9,188,183.

(30) Foreign Application Priority Data

Sep. 7, 2010 (JP) ................................. 2010-199986
Feb. 21, 2011 (JP) ................................. 2011-034223

(51) Int. Cl.
*F16D 65/18* (2006.01)
*F16H 25/22* (2006.01)
(Continued)

(52) U.S. Cl.
CPC ............. *F16D 65/18* (2013.01); *F16D 55/225* (2013.01); *F16D 55/226* (2013.01);
(Continued)

(58) Field of Classification Search
CPC .... F16D 55/226; F16D 65/18; F16D 2121/24; F16D 2125/40; F16D 2125/48; F16D 65/14; F16D 66/00; F16D 2066/005; F16H 25/2252; Y10T 74/18576; B60T 1/005; B60T 1/065; B60T 13/741; G01L 5/12
(Continued)

(56) References Cited

U.S. PATENT DOCUMENTS 2,959,073 A * 11/1960 Doerfer ................. F16B 21/186
411/517
3,393,574 A 7/1968 Roantree
(Continued)

FOREIGN PATENT DOCUMENTS

JP 2003-049911 2/2003
JP 2009-074684 4/2009
(Continued)

OTHER PUBLICATIONS

Extended European Search Report issued Apr. 1, 2016 in corresponding European Application No. 11 823 456.6.
(Continued)

*Primary Examiner* — Thomas J Williams
*Assistant Examiner* — San Aung
(74) *Attorney, Agent, or Firm* — Wenderoth, Lind & Ponack, L.L.P.

(57) ABSTRACT

An electric linear motion actuator includes planetary rollers mounted between the radially inner surface of an outer ring member and the radially outer surface of a rotary shaft, and a carrier rotatable about the rotary shaft and including radially movable roller shafts rotatably supporting the respective planetary rollers. Elastic rings each having circumferentially separate ends are each wrapped around the roller shafts to radially inwardly bias the roller shafts,
(Continued)

thereby bringing the respective planetary rollers into elastic contact with the radially outer surface of the rotary shaft. Each elastic ring is prevented from rotating relative to the roller shafts, thereby preventing one of the roller shafts from being axially aligned with the gap between the circumferential separate ends, causing the elastic ring to be radially compressed and thus making it impossible for the elastic rings to radially bias the roller shafts.

19 Claims, 10 Drawing Sheets

(51) Int. Cl.
   *F16D 55/226*   (2006.01)
   *F16D 55/225*   (2006.01)
   *F16D 121/24*   (2012.01)
   *F16D 125/40*   (2012.01)
   *F16D 125/48*   (2012.01)
   *F16D 125/50*   (2012.01)
   *F16D 127/00*   (2012.01)

(52) U.S. Cl.
   CPC ..... *F16H 25/2252* (2013.01); *F16D 2121/24* (2013.01); *F16D 2125/40* (2013.01); *F16D 2125/48* (2013.01); *F16D 2125/50* (2013.01); *F16D 2127/007* (2013.01); *Y10T 74/18576* (2015.01)

(58) Field of Classification Search
   USPC ................. 188/72.1, 72.7, 72.4, 73.43, 71.5
   See application file for complete search history.

(56) References Cited

U.S. PATENT DOCUMENTS

| | | | | |
|---|---|---|---|---|
| 4,532,462 A | * | 7/1985 | Washbourn | B60T 8/1893 188/162 |
| 4,546,298 A | * | 10/1985 | Wickham | B60T 8/1893 188/162 |
| 4,998,909 A | * | 3/1991 | Fuehrer | F16H 57/082 475/331 |
| 5,928,105 A | * | 7/1999 | Taha | F16H 57/04 475/331 |
| 6,918,853 B2 | * | 7/2005 | Tanikawa | F16H 57/082 475/331 |
| 7,695,399 B2 | * | 4/2010 | Sowul | F16H 57/082 475/331 |
| 2002/0147068 A1 | | 10/2002 | Chikaraishi et al. | |
| 2009/0057074 A1 | | 3/2009 | Tsuruta et al. | |
| 2009/0294224 A1 | | 12/2009 | Sakashita | |
| 2010/0163351 A1 | | 7/2010 | Sakashita et al. | |
| 2010/0320043 A1 | * | 12/2010 | Yamasaki | F16D 65/18 188/162 |

FOREIGN PATENT DOCUMENTS

| | | |
|---|---|---|
| JP | 2009-197863 | 9/2009 |
| JP | 2009-287732 | 12/2009 |
| JP | 2010-43674 | 2/2010 |
| JP | 2010-169248 | 8/2010 |

OTHER PUBLICATIONS

International Search Report issued Dec. 6, 2011 in International (PCT) Application No. PCT/JP2011/069735.

Written Opinion of the International Searching Authority, issued Dec. 6, 2011, in International (PCT) Application No. PCT/JP2011/069735 (with English translation).

Chinese Office Action issued Feb. 3, 2015 in corresponding Chinese Application No. 201180042788.7 (with partial English translation).

* cited by examiner

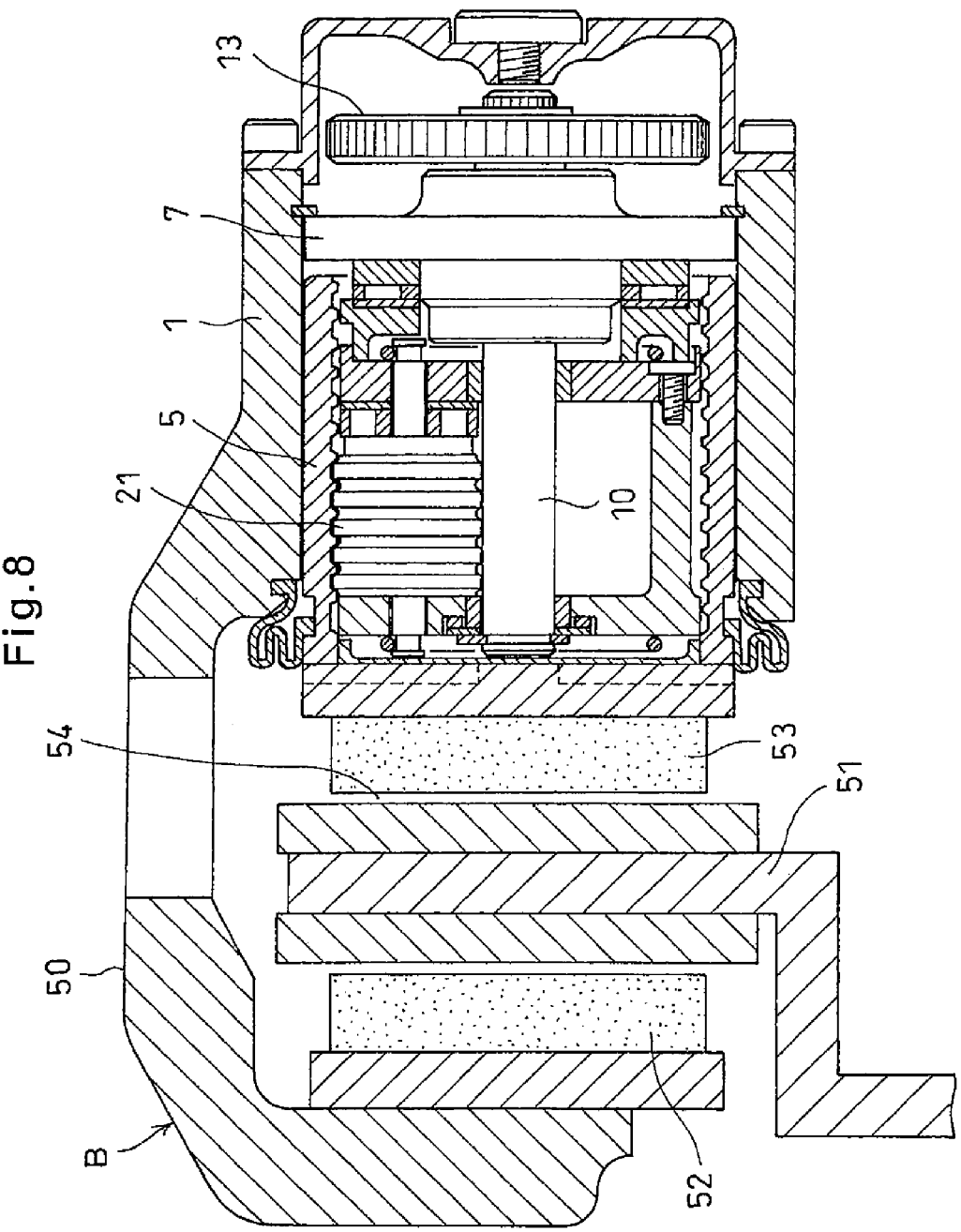

ELECTRIC LINEAR MOTION ACTUATOR AND ELECTRIC DISK BRAKE SYSTEM

TECHNICAL FIELD

This invention relates to an electric linear motion actuator for linearly driving a driven member such as brake pads, and an electric disk brake system including this electric linear motion actuator.

BACKGROUND ART

An electric linear motion actuator of this type includes a motion convertor mechanism which converts the rotary motion of the rotor shaft of an electric motor to a linear motion of an axially movable driven member.

Known motion convertor mechanisms used in this type of electric linear motion actuators include a ball-screw mechanism and a ball-ramp mechanism. These motion convertor mechanisms can increase power to some extent but cannot increase power to such an extent as required in an electric disk brake system.

Thus in an electric linear motion actuator using one of the above-mentioned motion convertor mechanisms, a speed reduction mechanism such as a planetary gear mechanism is additionally provided to increase driving force. Such a separate speed reduction mechanism adds to the complexity and the size of the electric linear motion actuator.

The applicant of the present invention has already proposed in JP 2009-197863A an electric linear motion actuator which is free of this problem, and which can sufficiently increase power without the need for a separate speed reduction mechanism and thus can be used in an electric disk brake system, of which the linear motion stroke is relatively small.

The electric linear motion actuator disclosed in JP 2009-197863A includes a rotary shaft rotated by an electric motor, an outer ring member provided around the rotary shaft, a plurality of planetary rollers mounted between the rotary shaft and the outer ring member, and a carrier rotatable about the rotary shaft and rotatably supporting the planetary rollers. When the rotary shaft rotates, the planetary rollers revolve around the rotary shaft while rotating about their respective axes due to frictional contact between the rotary shaft and the planetary rollers. A helical rib is formed on the radially inner surface of the outer ring member which engages in helical grooves or circumferential grooves formed in the radially outer surfaces of the respective planetary rollers such that the outer ring member and the carrier move in the axial direction relative to each other when the rotary shaft is rotated.

It is troublesome and thus costly to mount the planetary rollers between the radially outer surface of the rotary shaft and the radially inner surface of the outer ring member with an interference fit. Thus, in the electric linear motion actuator disclosed in JP 2009-197863A, the carrier supports roller shafts on which the respective planetary rollers are rotatably supported so as to be radially movable, and the roller shafts are all radially inwardly biased by elastic members, thereby elastically pressing the planetary rollers against the radially outer surface of the rotary shaft.

The elastic members used in the electric linear motion actuator disclosed in JP 2009-197863A are C-shaped rings each mounted around the roller shafts while kept in contact with the roller shafts to radially inwardly bias the roller shafts. The C-shaped rings are inexpensive but have the following problem to which no solution has yet been found.

Since the C-shaped rings each have circumferentially separate ends, when the roller shafts rotate even slightly about their respective axes due to rotation of the planetary rollers about their axes, the C-shaped rings move in the direction of the circle circumscribed about the roller shafts due to contact with the roller shafts, so that the C-shaped rings rotate in this direction until, eventually, one of the roller shafts radially aligns with and fits into the gap between the circumferentially separate ends of each C-shaped ring. This causes the C-shaped rings to radially shrink by their own elasticity. Once the C-shaped rings radially shrink, the C-shaped rings cannot press the planetary rollers against the radially outer surface of the rotary shaft any more, which in turn makes it impossible to transmit the rotation of the rotary shaft to the planetary rollers. In this state, the rotary shaft simply idles and the function of the electric linear motion actuator is lost.

SUMMARY OF THE INVENTION

An object of the invention is to keep the planetary rollers elastically in contact with the radially outer surface of the rotary shaft at all times using the inexpensive elastic rings such that the rotation of the rotary shaft is reliably transmitted to the planetary rollers at all times.

In order to achieve this object, the present invention provides an electric linear motion actuator comprising a cylindrical housing, an outer ring member mounted in the housing and having a center axis, a rotary shaft extending along the center axis of the outer ring member, a plurality of planetary rollers mounted between a radially outer surface of the rotary shaft and a radially inner surface of the outer ring member, a carrier supported on the rotary shaft so as to be rotatable about the rotary shaft and including as many roller shafts as the planetary rollers and rotatably supporting the respective planetary rollers, the roller shafts being movable in a radial direction of the rotary shaft, and elastic rings each having circumferentially separate ends and each fitted around the roller shafts so as to contact the respective roller shafts from radially outside, thereby biasing the respective planetary rollers against the radially outer surface of the rotary shaft, wherein the outer ring member has a helical rib formed on the radially inner surface of the outer ring member and in engagement with a helical groove or circumferential grooves formed on a radially outer surface of each of the planetary rollers, whereby when the rotary shaft rotates, the planetary rollers are configured to rotate about center axes of the respective planetary rollers while revolving around the rotary shaft, due to frictional contact between the rotary shaft and the respective planetary rollers, thereby moving the outer ring member and the carrier relative to each other in the direction of the center axis of the rotary shaft, wherein the electric linear motion actuator further comprises rotation stop means provided between the respective elastic rings and the roller shafts and configured to prevent the respective elastic rings from rotating relative to the roller shafts in a direction of a circle circumscribed about the roller shafts.

The present invention also provides an electric disk brake system comprising a brake disk, brake pads, and an electric linear motion actuator for linearly driving one of the brake pads and pressing the brake pads against the brake disk, thereby generating a brake force, wherein the electric linear motion actuator is the electric linear motion actuator according to the present invention.

In this electric linear motion actuator, when the rotary shaft is rotated by a driving source, the planetary rollers rotate about their respective center axes while revolving around the rotary shaft, due to frictional contact between the rotary shaft and the respective planetary rollers. In this state, since the helical rib formed on the radially inner surface of the outer ring member is engaged in the helical grooves or circumferential grooves formed on the radially outer surfaces of the respective planetary rollers, one of the outer ring member and the carrier moves linearly in the axial direction.

Thus, by connecting one of the brake pads of the electric disk brake system to the above one of the outer ring member and the carrier, it is possible to linearly drive the brake pads and press them against the brake disk, thereby applying a braking force to the brake disk.

In the electric linear motion actuator according to the present invention, since the rotation stop means prevent rotation of the elastic rings, which is fitted around the roller shafts so as to contact the respective roller shafts from radially outside, thereby radially inwardly biasing the roller shafts, it is possible to keep constant the relative positional relationship between the roller shafts and the elastic rings, and thus to always keep the planetary rollers elastically pressed against the radially outer surface of the rotary shaft by radially inwardly biasing the roller shafts with the elastic rings. This in turn makes it possible to reliably transmit the rotation of the rotary shaft to the planetary rollers.

The rotation stop means may each include engaging pieces inwardly protruding from the respective circumferentially separate ends of the elastic ring, and in engagement with two circumferentially adjacent ones of the roller shafts, respectively. Alternatively, the rotation stop means may each include a straight portion of the elastic ring extending between two adjacent ones of the roller shafts, and bent portions of the elastic ring at respective ends of the straight portion, the bent portions being in engagement with the two adjacent ones of the roller shafts, respectively. Further alternatively, the rotation stop means may each include a curved portion of each elastic ring extending between two adjacent ones of the roller shafts so as to be radially inwardly concaved from the two adjacent ones of the roller shafts, and bent portions of the elastic ring at respective ends of the curved portion, the bent portions being in engagement with the respective two adjacent ones of the roller shafts.

Instead of such elastic rings, which have circumferentially separate ends, ring springs each having at least one turn may be each mounted around the roller shafts so as to contact the roller shafts from radially outside, thereby radially inwardly biasing the roller shafts. With this arrangement too, it is possible to reliably keep the planetary rollers elastically pressed against the radially outer surface of the rotary shaft.

In the electric linear motion actuator according to the present invention, since the rotation stop means prevent rotation of the elastic rings, which are fitted around the roller shafts so as to contact the respective roller shafts from radially outside, thereby radially inwardly biasing the roller shafts, it is possible to always keep the planetary rollers elastically pressed against the radially outer surface of the rotary shaft by radially inwardly biasing the roller shafts with the elastic rings. This in turn makes it possible to reliably transmit the rotation of the rotary shaft to the planetary rollers. This ensures reliable operation of the electric linear motion actuator at all times.

BRIEF DESCRIPTION OF THE DRAWINGS

FIG. 8 is a vertical sectional view of an electric disk brake system embodying the present invention.

DETAILED DESCRIPTION OF THE INVENTION

Figure 1:
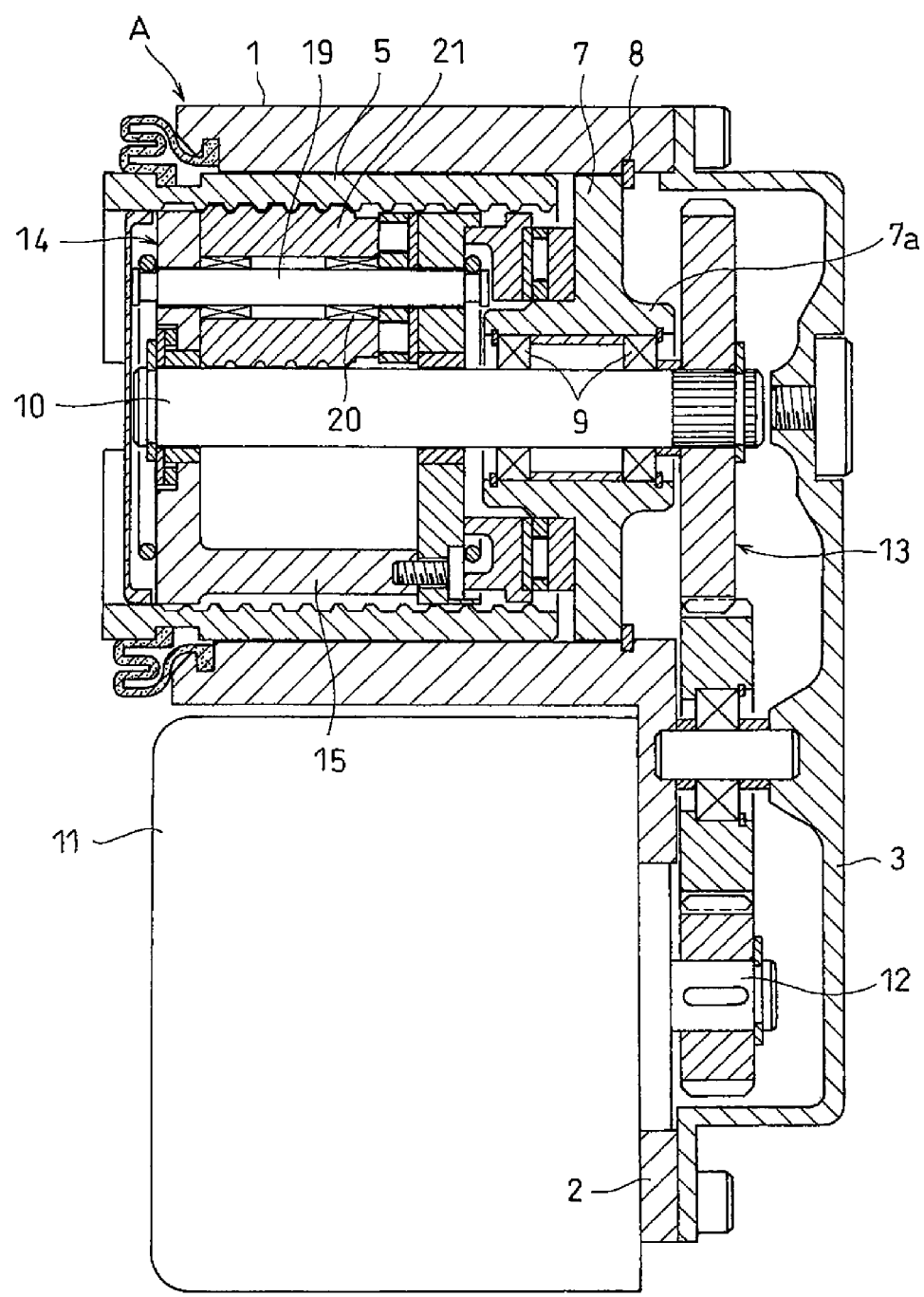
FIG. 1 is vertical sectional view of an electric linear motion actuator embodying the present invention.

The embodiments of the present invention are now described with reference to the drawings. FIG. 1 shows an electric linear motion actuator A embodying the invention, which includes a cylindrical housing 1 having a base plate 2 protruding radially outwardly from a first end of the housing to one side of the housing. The base plate 2 has its outer side covered by a cover 3 fixed to the first end of the housing 2 by bolts.

Figure 2:
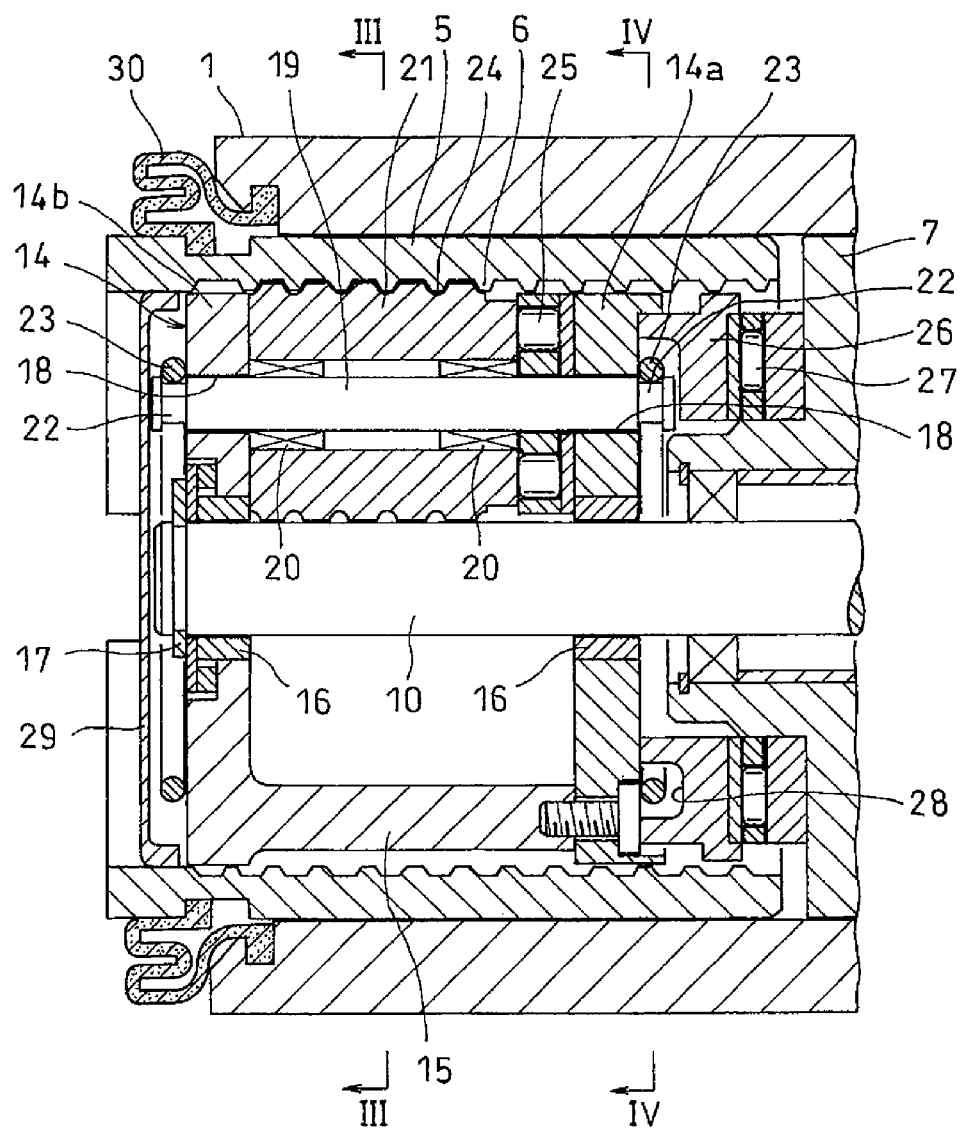
FIG. 2 is an enlarged sectional view of a portion of FIG. 1.

An outer ring member 5 is mounted in the housing 1. The outer ring member 5 is rotationally fixed but is axially slidable along the radially inner surface of the housing 1. As shown in FIG. 2, the outer ring member 5 has a radially inner surface formed with a helical rib 6 having a V-shaped cross-section.

As shown in FIG. 1, a bearing member 7 is mounted in the housing 1 at a first axial end of the outer ring member 5. The bearing member 7 is a disk-shaped member having a boss 7a at its center. A snap ring 8 fitted to the radially inner surface of the housing 1 prevents the bearing member 7 from moving toward the cover 3.

Two rolling bearings 9 are mounted in the boss 7a of the bearing member 7 so as to be axially spaced apart from each other. The rolling bearings 9 rotatably support a rotary shaft 10 extending along the center axis of the outer ring member 5.

An electric motor 11 is supported on the base plate 2 of the housing 1. The motor 11 has a rotor shaft 12 whose rotation is configured to be transmitted to the rotary shaft 10 through a reduction gear train 13 mounted in the cover 3.

Figure 3:
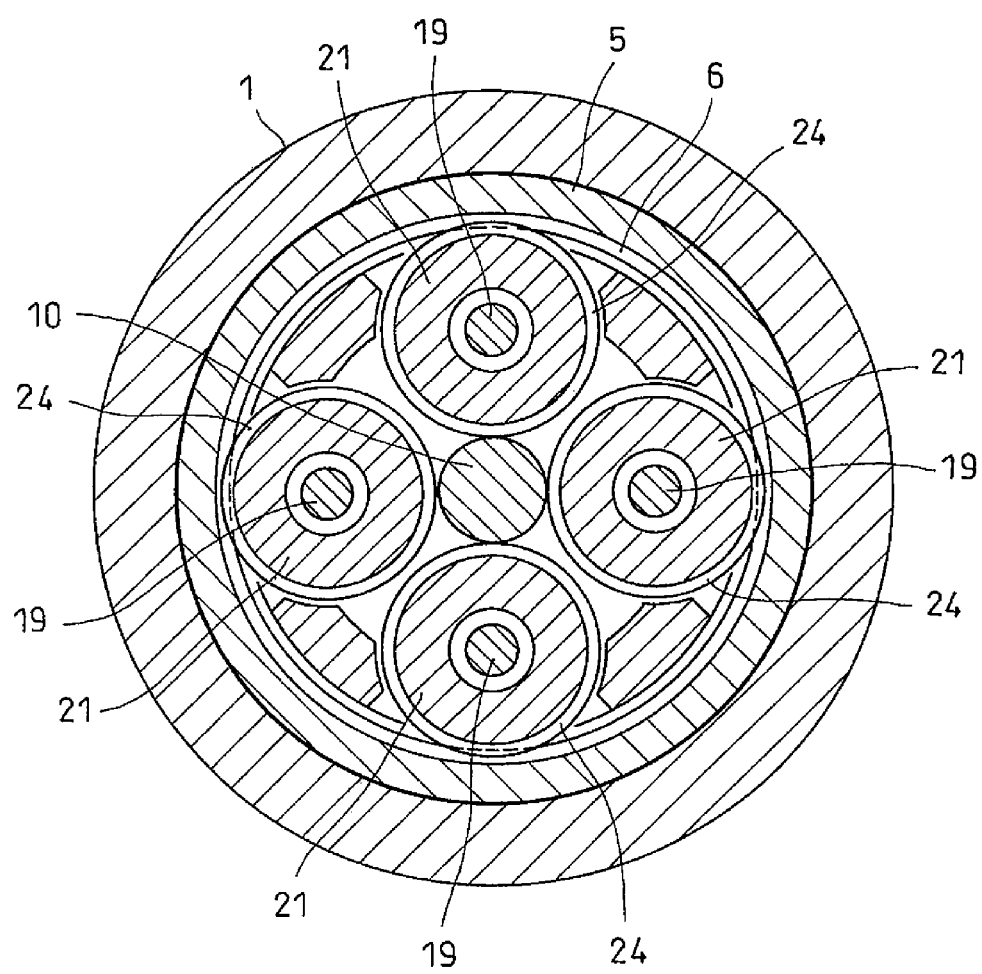
FIG. 3 is a sectional view taken along line III-III of FIG. 2.

A carrier 14 is mounted in the outer ring member 5 and is rotatable about the rotary shaft 10. As shown in FIGS. 2 and 3, the carrier 14 includes two disks 14a and 14b that axially face each other. The disk 14b has a plurality of spacer bars 15 keeping the disks 14a and 14b axially spaced apart from each other by a predetermined distance.

The carrier 14 is supported by slide bearings 16 mounted radially inwardly of the respective disks 14a and 14b so as to be rotatable about the rotary shaft 10 and axially slidable. A snap ring 17 fitted to the rotary shaft 10 at the distal end thereof prevents separation of the carrier 14 from the free end of the rotary shaft 10.

Four shaft inserting holes 18 are formed in each of the two disks 14a and 14b so as to be angularly spaced apart by 90° from each other and so as to axially face the respective four holes 18 of the other disk 14a, 14b. A roller shaft 19 has its ends inserted in the respective ones of each axially opposed pair of shaft inserting holes 18. A planetary roller 21 is rotatably mounted on each roller shaft 19 through an axially opposed pair of bearings 20 mounted on the roller shaft 19.

The shaft inserting holes 18 of the disks 14a and 14b are radially elongated holes, so that the roller shafts 19 are movable within the range limited by the longitudinal ends of the respective elongated holes.

The first and second end portions of each roller shaft 19 extend through the respective disks 14a and 14b such that the first and second extreme end portions thereof protrude from the outer surfaces of the respective disks 14a and 14b. First and second circumferential grooves 22 are formed on the outer peripheries of the respective first and second extreme end portions of the roller shaft 19. Elastic rings 23 are fitted in the first and second circumferential grooves 22, respectively, so as to contact the bottoms of the grooves 22 from radially outside.

Figure 4:
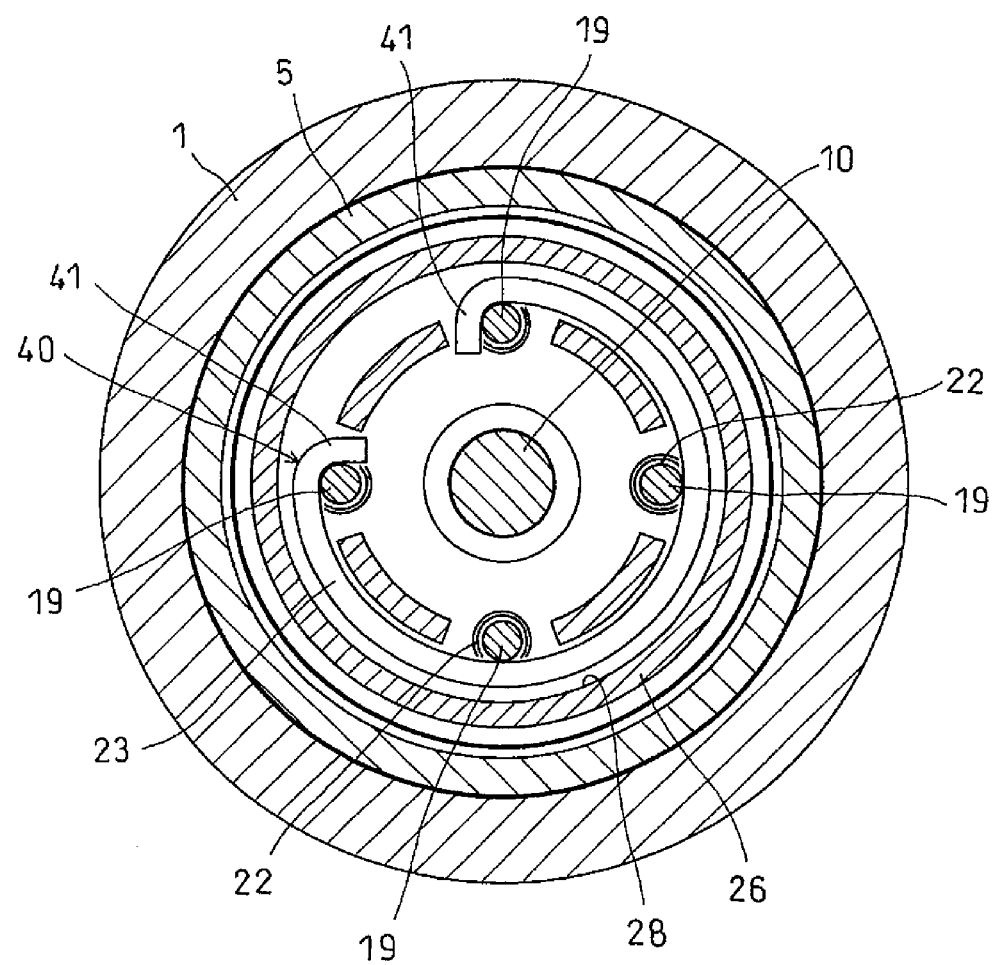
FIG. 4 is a sectional view taken along line IV-IV of FIG. 2.

As shown in FIGS. 2 and 4, the elastic rings 23 are C-shaped members having circumferentially opposed separate ends, and mounted in position in a radially expanded state, thereby biasing the roller shafts 19 radially inwardly with their elastic force tending to return to their original small-diameter state. Thus, when the rotary shaft 10 rotates, the planetary rollers 21 are rotated due to frictional contact between the planetary rollers 21 and the radially outer surface of the rotary shaft 10.

The elastic rings 23 have rotation stop means 40, respectively, for preventing the elastic rings 23 from rotating relative to the roller shafts 19 in the direction of the circle circumscribed about the roller shafts 19.

The rotation stop means 40 may each include, as shown in FIG. 4, radially inwardly bent engaging pieces 41 provided at the respective circumferentially opposed ends of the elastic ring 23 and kept in engagement with two circumferentially adjacent ones of the roller shafts 19, respectively.

A helical groove 24 is formed on the radially outer surface of each planetary roller 21 with the same pitch as the pitch of the helical rib 6 of the outer ring member 5. The helical rib 6 is engaged in the helical grooves 24 of the respective planetary rollers 21. Instead of the helical groove 24, a plurality of circumferential grooves may be formed with the same pitch as the pitch of the helical rib 6.

Thrust bearings 25 are mounted between the inner one of the disks 14a and 14b of the carrier 14 located nearer to the bearing member 7, i.e. the disk 14a and the end surfaces of the respective planetary rollers 21 facing the disk 14a, respectively.

An annular support member 26 and a thrust bearing 27 are mounted between the opposed surfaces of the inner disk 14a of the carrier 14 and the bearing member 7. The thrust bearing 27 supports axial thrust loads applied to the carrier 14 and the support member 26.

The support member 26 is formed with an annular groove 28 in its surface facing the inner disk 14a, and the elastic ring 23 is received in the annular groove 28.

The opening of the outer ring member 5 at its second end, which protrudes from the opening of the housing 1 at its second end, is closed by a seal cover 29, thus preventing entry of foreign matter into the device. A boot 30 is mounted between the second ends of the housing 1 and the outer ring member 5 to close the portion of the opening of the housing 1 radially outwardly of the outer ring member 5, thereby preventing entry of foreign matter into the device.

FIG. 8 shows an electric disk brake system B in which the electric linear motion actuator A of the above-described embodiment is mounted. The electric disk brake system B includes a caliper body 50 integrally connected to the second end of the housing 1 of the electric linear motion actuator A, a brake disk 51 arranged such that its radially outer portion passes the interior of the caliper body 50, and fixed and movable brake pads 52 and 53 disposed on the respective sides of the brake disk 51. The movable brake pad 53 is coupled to the second end of the outer ring member 5.

Now the operation of the electric linear motion actuator A is described when it is mounted in the electric disk brake system B as shown in FIG. 8. When the rotary shaft 10 is rotated by the electric motor 11, shown in FIG. 1, the planetary rollers 21 revolve around the shaft 10 while rotating about their own axes due to frictional contact between the planetary rollers 21 and the rotary shaft 10.

Since the helical rib 6, which is formed on the radially inner surface of the outer ring member 5, is engaged in the helical grooves 24 formed on the radially outer surfaces of the respective planetary rollers 21, when the planetary rollers 21 revolve around the shaft 10 while rotating about their respective axes, the outer ring member 5 is moved in the axial direction until the movable brake pad 53 is pressed against the brake disk 51, thereby applying a braking force to the brake disk 51.

In the electric linear motion actuator shown in FIGS. 1 to 4, the planetary rollers 21 are elastically pressed against the radially outer surface of the rotary shaft 10 by radially inwardly biasing the respective roller shafts 19 with the elastic rings 23, and the elastic rings 23 are prevented from rotating relative to the roller shafts 19 by the rotation stop means 40. With this arrangement, it is possible to keep constant the relative positional relationship between the roller shafts 19 and the elastic rings 23, and thus to always keep the planetary rollers 21 elastically pressed against the radially outer surface of the rotary shaft 10 by radially inwardly biasing the roller shafts 19 with the elastic rings 23. This in turn makes it possible to reliably transmit the rotation of the rotary shaft 10 to the planetary rollers 21, preventing malfunction of the electric linear motion actuator.

The rotation stop means 40 of FIG. 4 is in the form of radially inwardly protruding engaging pieces 41 provided at the respective ends of each elastic ring 23 and kept in engagement with two circumferentially adjacent ones of the roller shafts 19, respectively. But different rotation stop means 40 may be used.

Figure 5:
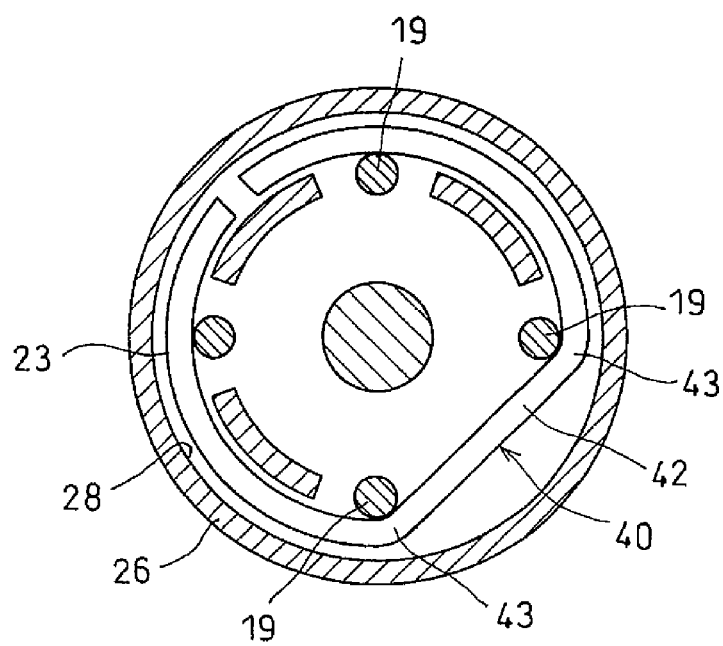
FIG. 5 is a sectional view of a different rotation stop means for preventing rotation of an elastic ring.
Figure 6:
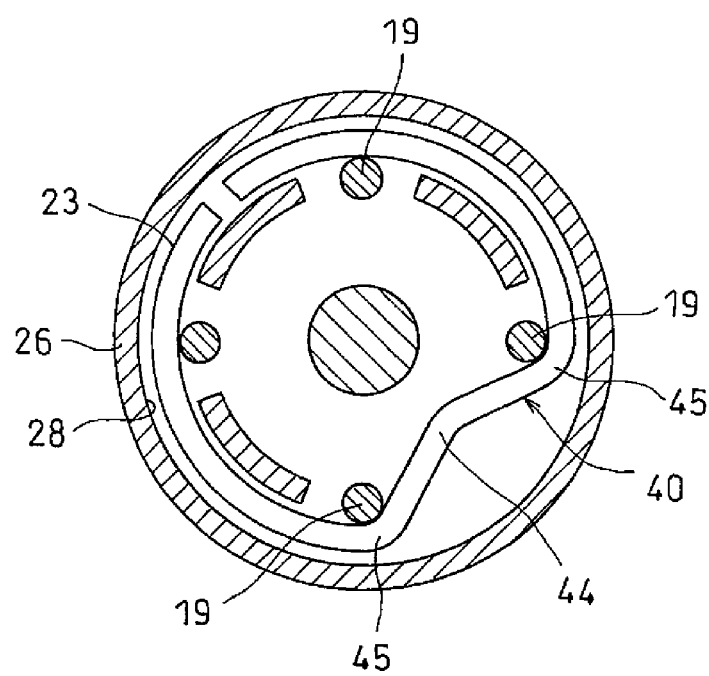
FIG. 6 is another different rotation stop means for preventing rotation of the elastic ring.

FIGS. 5 and 6 show such different rotation stop means 40. The rotation stop means 40 shown in FIG. 5 includes a straight portion 42 of each elastic ring 23 that extends between two adjacent ones of the roller shafts 19, and bent portions 43 at the respective ends of the straight portion 42 which engage the respective two adjacent roller shafts 19, thereby preventing rotation of the elastic ring 23.

The rotation stop means 40 of FIG. 6 includes a curved portion 44 of each elastic ring 23 extending between two adjacent ones of the roller shafts 19 so as to be radially inwardly concaved from the two adjacent ones of the roller shafts 19, and bent portions 45 at the respective ends of the curved portion 44 which engage the respective two adjacent roller shafts 19, thereby preventing rotation of the elastic ring 23.

Either of the rotation stop means 40 can reliably prevent rotation of the elastic rings 23, thereby always keeping the planetary rollers 21 elastically pressed against the radially outer surface of the rotary shaft 10 by radially inwardly biasing the roller shafts 19. This prevents malfunction of the electric linear motion actuator.

In the embodiment, the outer ring member 5 is configured to be moved in the axial direction when the planetary rollers 21 revolve around the rotary shaft while rotating about their own axes. But instead, the outer ring member 5 may be fixed in position such that the carrier 14 is moved in the axial direction when the planetary rollers revolve and rotate.

Figure 7A:
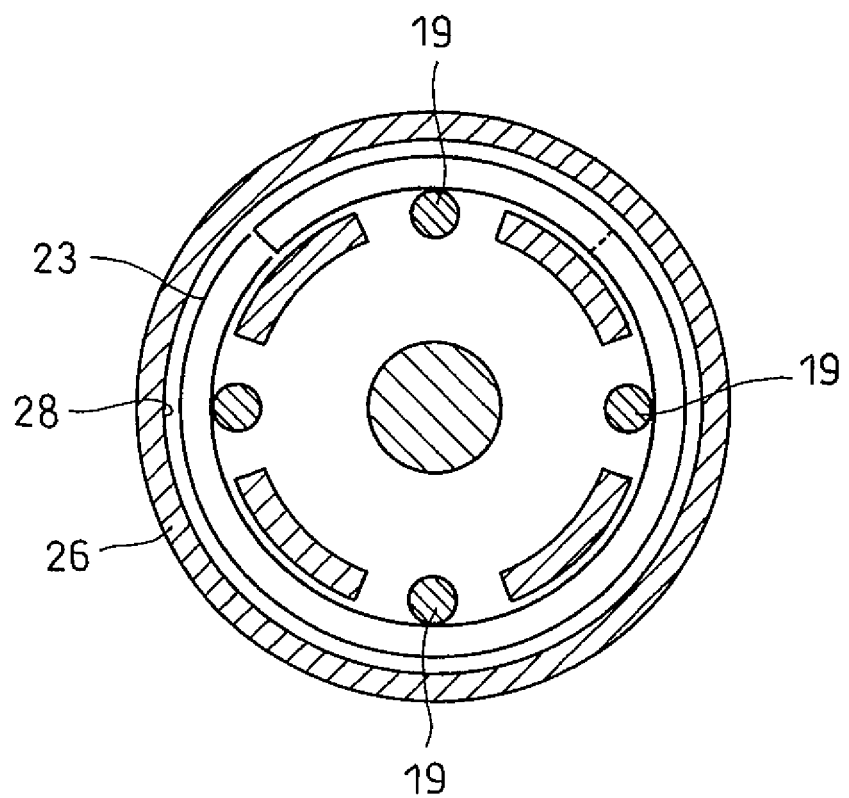
FIG. 7A is a vertical sectional view of an electric linear motion actuator according to another embodiment of the present invention.
Figure 7B:
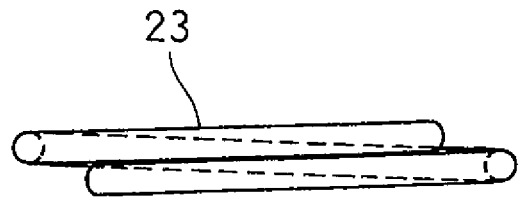
FIG. 7B is a plan view of an elastic ring.

In the embodiments of FIGS. 4 to 6, elastic rings 23 are used that each have circumferentially separate ends and are provided with the rotation stop means 40. In the embodiment of FIGS. 7A and 7B, instead of such elastic rings, ring springs 23 each having at least one turn are each mounted around the roller shafts 19 so as to contact the roller shafts 19 from radially outside, thereby radially inwardly biasing the roller shafts 19.

With the arrangement of the embodiment of FIGS. 7A and 7B too, it is possible to reliably keep the planetary rollers 21 elastically pressed against the radially outer surface of the rotary shaft 10.

In the electric linear motion actuator A shown in FIGS. 1 and 2, the helical rib 6 formed on the radially inner surface of the outer ring member 5 has a small lead angle in order to ensure a sufficiently high load conversion rate. Thus if this electric linear motion actuator A is used in the disk brake system B shown in FIG. 8, the electric motor 11 has to make a large number of revolutions until the gap 54 between the brake pad 53 and the brake disk 51 disappears. Brake response of the disk brake system B is thus not sufficient, and it desired to further reduce the brake response time.

Figure 9:
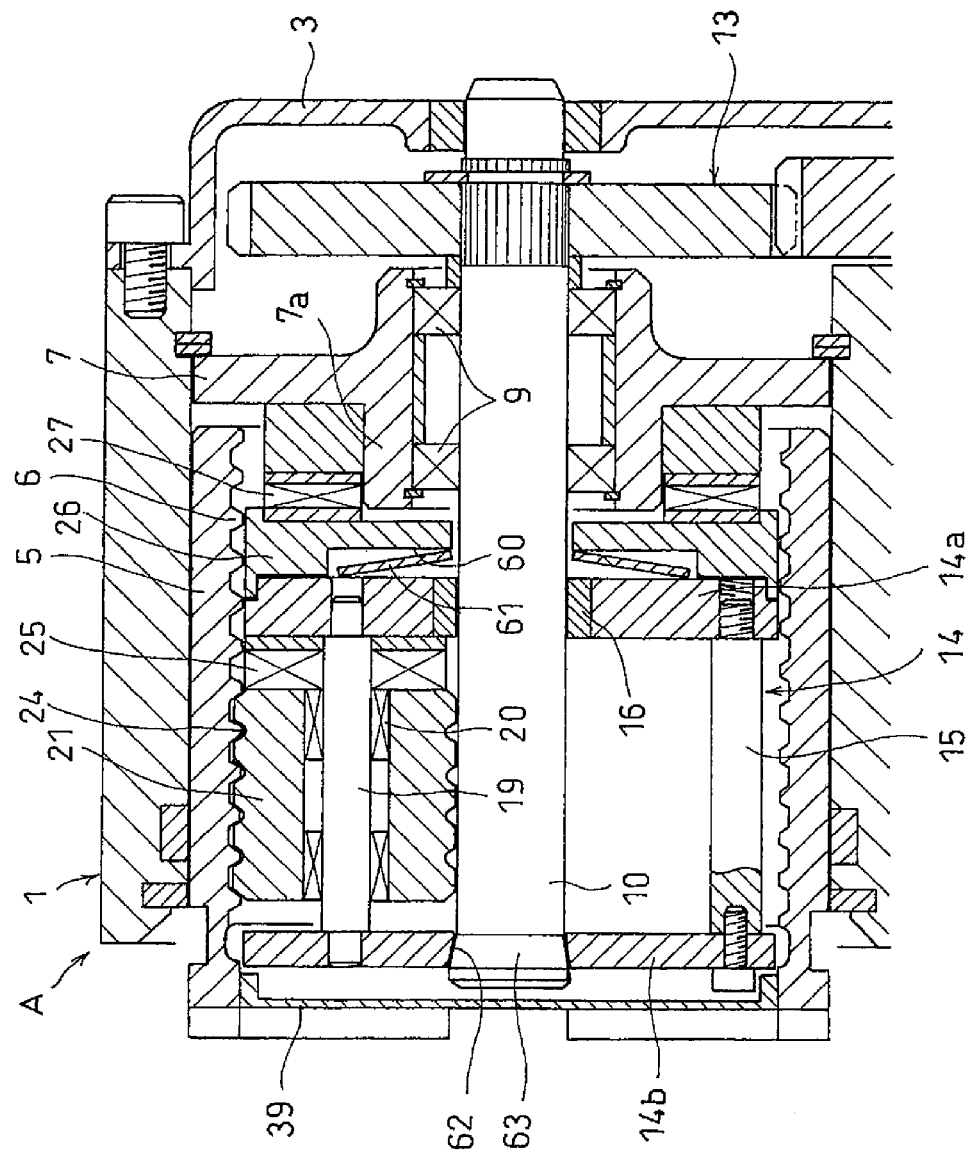
FIG. 9 is a vertical sectional view of an electric linear motion actuator according to still another embodiment of the present invention.
Figure 10:
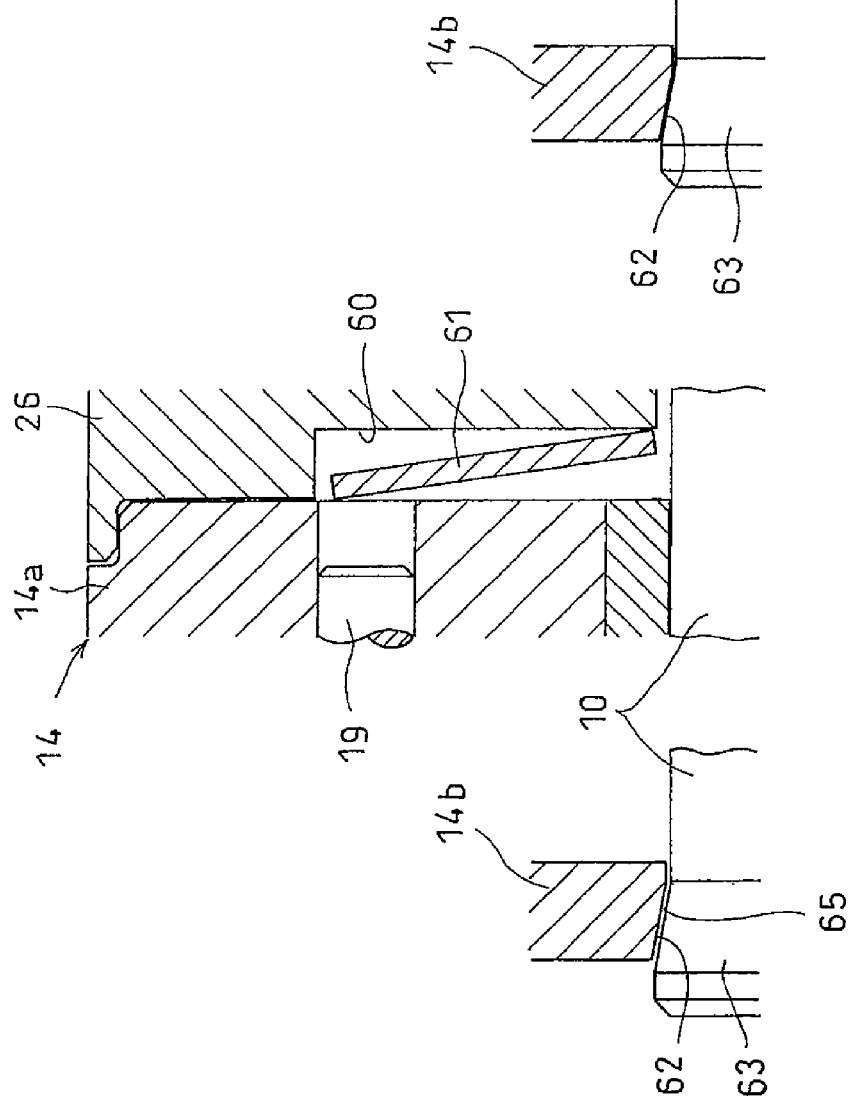
FIG. 10A is a sectional view showing how the rotary shaft is coupled to the carrier.
FIG. 10B is a sectional view showing the state in which the carrier is uncoupled from the rotary shaft.
Figure 11:
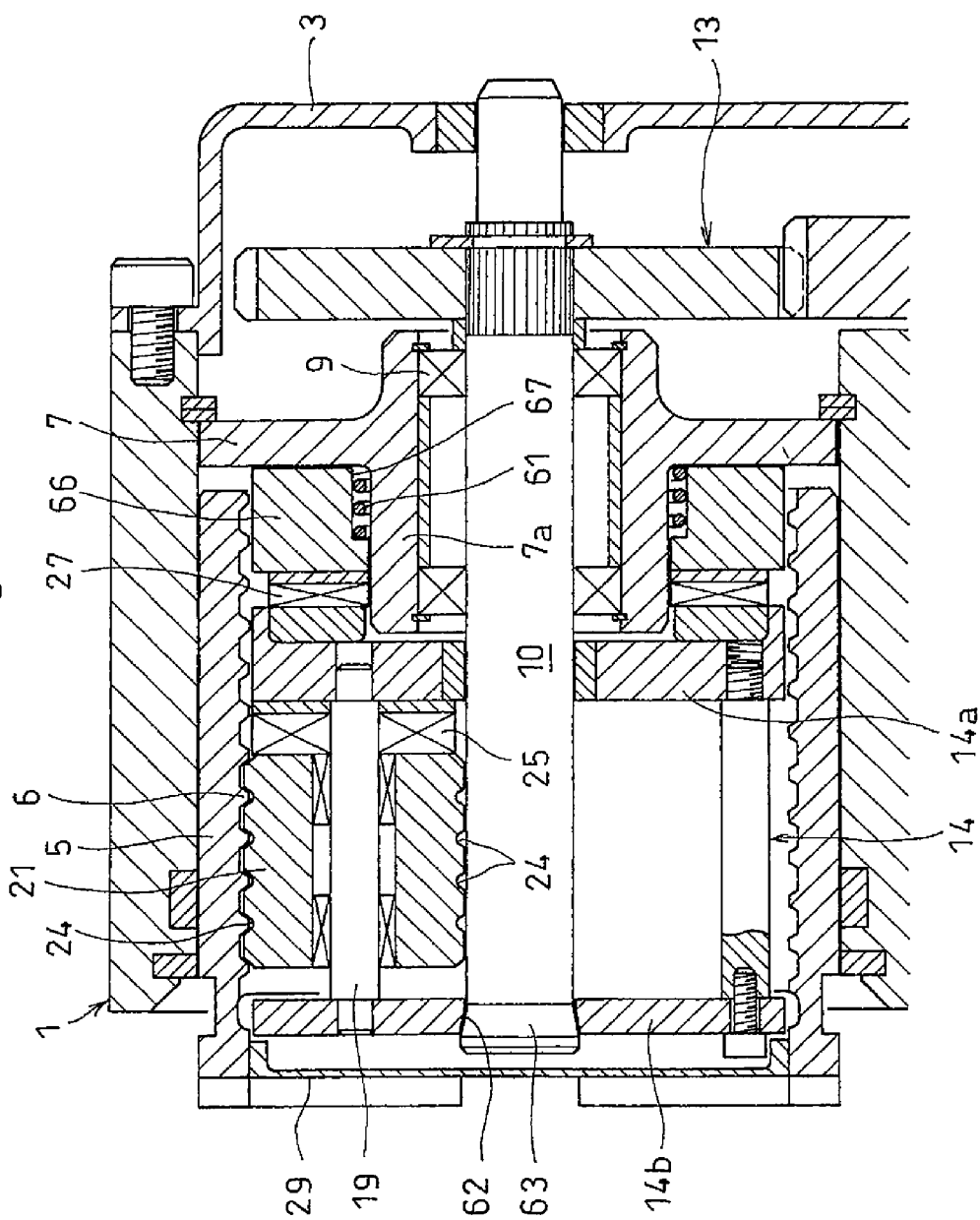
FIG. 11 is a vertical sectional view of an electric linear motion actuator according to still another embodiment of the present invention.

FIGS. 9 to 11 show electric linear motion actuators which can improve the brake response of the disk brake system B. The electric linear motion actuator of FIG. 9 includes a friction coupling means configured to frictionally fixedly couple the carrier 14 to the rotary shaft 10 while an axial load on the outer ring member 5 that tends to push in the outer ring member 5 is small, and to uncouple them under the axial load when the axial load is large.

The friction coupling means includes a spring receiving recess 60 formed in the support member 26, an elastic member 61 in the form of a disk spring received in the spring receiving recess 60 and biasing the carrier 14, which supports the planetary rollers 21, toward the distal end of the rotary shaft 10, a tapered shaft inserting hole 62 formed in the outer disk 14*b* of the carrier 14, and a positioning portion 63 which is a tapered shaft portion formed at the distal end of the rotary shaft 10 and configured to be pressed against the radially inner surface of the tapered shaft inserting hole 62 under the biasing force of the elastic member 61.

The electric linear motion actuator shown FIG. 9 differs from the electric linear motion actuator A of FIGS. 1 and 2 in that the former further includes the above-described friction coupling means and that circumferential grooves 24 are formed on the radially outer surface of each planetary roller 21. Elements identical to those of the electric linear motion actuator A of FIGS. 1 and 2 are denoted by identical numerals, and their description is omitted.

Suppose now that the electric linear motion actuator A of FIG. 9 is used in the electric disk brake system B shown in FIG. 8. When the rotary shaft 10 is rotated by the motor 11 shown in FIG. 1, the planetary rollers 21 rotate and/or revolve due to frictional contact with the rotary shaft 10.

In this state, since the axial gap 54 is present between the movable brake pad 53 and the brake disk 51, and thus no axial load is being applied to the outer ring member 5 that tends to push in the outer ring member 5, as shown in FIG. 10A, the inner wall of the shaft inserting hole 62 of the outer disk 14*b* is pressed against the radially outer tapered surface of the positioning portion 63 under the biasing force applied to the carrier 14 by the elastic member 61. The carrier 14 is thus rotationally fixed to the rotary shaft 10.

Thus in this state, when the rotary shaft 10 rotates, the planetary rollers 21 simply revolve around the shaft 10 without rotating about their respective axes, as though the planetary rollers 21 are integral with the carrier 14 and the rotary shaft 10. Since the helical rib 6 formed on the radially inner surface of the outer ring member 5 is engaged in the circumferential grooves 24 formed on the radially outer surfaces of the planetary rollers 21, the outer ring member 5 is moved in the axial direction when the planetary rollers revolve around the rotary shaft.

In this arrangement, while no axial load is being applied to the outer ring member 5, since the planetary rollers 21 revolve around the rotary shaft 10 without rotating about their respective axes, the apparent lead angle increases, so that the outer ring member 5 moves quickly in the axial direction, so that the axial gap 54 between the movable pad 53 and the brake 51 disappears quickly.

When the movable brake pad 53 abuts the brake disk 51, and the outer ring member 5 is further moved in the same axial direction, the axial load applied to the outer ring member 5 that tends to push in the outer ring member 5 gradually increases.

When the axial load applied to the outer ring member 5 that tends to push in the outer ring member 5 exceeds the biasing force of the elastic member 61, this axial load is applied to the elastic member 61 through the carrier 14 so as to elastically deform the elastic member 61 as shown in FIG. 10B. That is, the elastic member 61 is deformed such that the carrier 14 is moved away from the positioning portion 63 until an axial gap 64 between the carrier 14 and the support member 26 disappears.

When the carrier 14 is moved axially away from the positioning portion 63, as shown in FIG. 10B, a gap 65 forms between the radially inner surface of the shaft inserting hole 62 of the outer disk 14*b* and the tapered radially outer surface of the positioning portion 63, thus uncoupling the carrier 14 from the rotary shaft 10. Once the carrier 14 is uncoupled from the rotary shaft 10, the planetary rollers 21, which are in frictional contact with the rotary shaft 10, begin to rotate about their respective axes while revolving around the rotary shaft 10. Since the helical rib 6 formed on the radially inner surface of the outer ring member 5 is engaged in the circumferential grooves 24 formed on the radially outer surfaces of the respective planetary rollers 21, the outer ring member 5 is simultaneously moved in the axial direction.

Thus, when the axial load applied to the outer ring member 5 exceeds the biasing force of the elastic member 61, since the planetary rollers 21 rotate about their respective axes while revolving around the rotary shaft 10, the apparent lead angle decreases, while the load conversion rate correspondingly increases.

In this arrangement, in which carrier 14 is biased toward the positioning portion 63 at the distal end of the rotary shaft 10 by the elastic member 61 such that while no axial load is being applied to the outer ring member 5, the carrier 14 is frictionally coupled to the rotary shaft 10, and when the axial load applied to the outer ring member 5 exceeds the biasing force of the elastic member 61, the carrier 14 is uncoupled from the rotary shaft 10, the rotary motion of the rotary shaft 10 can be converted to the linear motion of the outer ring member 5 through different paths in the motion convertor mechanism according to the axial load applied to the outer ring member 5.

The following equations (1) and (2) define, respectively, the apparent lead angle $\alpha_1$ while no axial load is being applied to the outer ring member 5, so that the carrier 14 is coupled to the rotary shaft 10 and the planetary rollers 21 only revolve around the rotary shaft 10 without rotating about their respective axes, and the apparent lead angle $\alpha_2$ when the above axial load increases until the carrier 14 is uncoupled from, and thus becomes rotatable relative to, the rotary shaft 14, and as a result, the planetary rollers 21 begin to rotate about their respective axes while revolving around the rotary shaft 10:

$$\alpha_1 = \tan^{-1}\{(2 \cdot x_1)/(d_s \cdot \theta_s)\} \quad (1)$$

$$\alpha_2 = \tan^{-1}\{(2 \cdot x_2)/(d_s \cdot \theta_s)\} \quad (2)$$

where $\alpha_1$ is the apparent lead angle while no axial load is being applied;

$\alpha_2$ is the apparent lead angle when the axial load is large;

$d_o$ is the inner diameter of the outer ring member 5;

$d_s$ is the outer diameter of the rotary shaft 10;

$x_1$ is the axial moving distance of the outer ring member 5 while no axial load is being applied ($=d_o/2 \cdot \theta_s \cdot \tan \alpha_o$);

$x_2$ is the axial moving distance of the outer ring member 5 when the axial load is large ($=d_o/2 \cdot (\tan \alpha_o - \tan \alpha_p) \cdot \theta_{rev}$);

$\alpha_o$ is the lead angle of the helical rib 6 of the outer ring member 5;

$\alpha_p$ is the lead angle of the circumferential grooves 24 of the planetary rollers 21 (=zero degrees);

$\theta_{rev}$ is the revolving angle of the planetary rollers 21 around the rotary shaft ($=d_s/(d_o+d_s) \cdot \theta_s$); and $\theta_s$ is the rotational angle of the rotary shaft 10.

Equations (1) and (2) can thus be converted to the following equations (3) and (4), respectively:

$$\alpha_1 = \tan^{-1}(d_o/d_s \cdot \tan \alpha_o) \quad (3)$$

$$\alpha_2 = \tan^{-1}\{d_o/(d_o+d_s) \cdot \tan \alpha_o\} \quad (4)$$

Since the load conversion rate $\beta$ and the apparent lead angle have the relationship given by the following equation (5), the smaller the lead angle, the larger the load conversion rate:

$$\beta = \eta/\tan \alpha$$

where $\eta$ is the efficiency of the linear motion mechanism.

From this, it is apparent that while no axial load is being applied to the outer ring member 5, the apparent lead angle is larger than while an axial load is being applied to the outer ring member 5, so that the outer ring member 5 is axially moved by a longer distance when the rotary shaft 10 rotates the same distance. Thus, immediately after the brake operation begins, where the load is low, the outer ring member 5 is axially moved a long distance with a small amount of rotation of the rotary shaft 10, so that it is possible to quickly move the movable brake pad 53 toward the brake disk 51 until the axial gap 64 therebetween disappears, thus improving the brake response of the electric disk brake system.

On the other hand, when the axial load applied to the outer ring member 5 increases, the apparent lead angle decreases (and the load conversion rate increases), so that it becomes possible to generate a large axial force with a smaller torque. This in turn allows the electric disk brake system B to produce a necessary large load without increasing the size of the electric motor 11 and thus the entire electric linear motion actuator A.

Also, since a stable load is applied to the carrier 14 and the planetary rollers 21 by the elastic member 61, the actuator operates in a stable manner. The holes formed in the pair of disks 14a and 14b of the carrier 14 in which the roller shafts 19 are inserted do not have to be elongated holes but may be simple round holes. Such round holes can be formed at a lower cost than elongated holes.

In FIG. 9, the positioning portion 63 is a tapered shaft portion having a tapered radially outer surface, against which the tapered radially inner surface of the shaft inserting hole 62 formed in the outer disk 14b is pressed. But instead, a flange may be formed at the distal end of the rotary shaft 10 such that the outer disk 14b of the carrier 14 can be pressed against the side of the flange.

In FIG. 9, a disk spring is used as the elastic member 61. But instead, a coil spring or a wave spring may be used. The elastic member 61 may not be mounted between the opposed surfaces of the support member 26 and the carrier 14. In FIG. 11 for example, a coil spring as the elastic member 61 is mounted in a spring receiving recess 67 formed in the radially inner surface of a bearing disk 66 mounted between the bearing member 7 and the thrust bearing 27 so as to bias the carrier 14 toward the positioning portion 63.

What is claimed is:

1. An electric linear motion actuator comprising:
    a housing;
    an outer ring member mounted in the housing and having a center axis;
    a rotary shaft extending along the center axis of the outer ring member, and configured to be rotationally driven by an electric motor;
    a carrier supported on the rotary shaft so as to be rotatable about the rotary shaft; and
    planetary rollers mounted between a radially outer surface of the rotary shaft and a radially inner surface of the outer ring member, and rotatably supported by the carrier,
    wherein the outer ring member has a helical rib formed on the radially inner surface of the outer ring member and in engagement with circumferential grooves formed on a radially outer surface of each of the planetary rollers,
    whereby when the rotary shaft rotates, the planetary rollers are configured to rotate due to frictional contact between the rotary shaft and the respective planetary rollers, thereby moving the outer ring member in an axial direction,
    wherein the electric linear motion actuator further comprises a friction coupling arrangement configured to frictionally fixedly couple the carrier to the rotary shaft while an axial load applied to the outer ring member in a push-in direction is small, and to uncouple the carrier from the rotary shaft under the axial load when the axial load is large.

2. The electric linear motion actuator according to claim 1, wherein the friction coupling arrangement comprises a positioning portion formed at an end portion of the rotary shaft and configured to limit a movement of the carrier in the axial direction, and an elastic member biasing the carrier toward the positioning portion.

3. The electric linear motion actuator according to claim 2, wherein the positioning portion is a tapered shaft portion having a diameter that increases toward the shaft end of the rotary shaft.

4. The electric linear motion actuator according to claim 2, further comprising a bearing member positioned by the housing in the axial direction, and rotatably supporting a shaft end portion of the rotary shaft to which torque is input, wherein the elastic member is incorporated between opposed portions of the carrier and the bearing member that are opposed to each other in the axial direction.

5. The electric linear motion actuator according to claim 3, further comprising a bearing member positioned by the housing in the axial direction, and rotatably supporting a shaft end portion of the rotary shaft to which torque is input, wherein the elastic member is incorporated between opposed portions of the carrier and the bearing member that are opposed to each other in the axial direction.

6. The electric linear motion actuator according to claim 2, wherein the elastic member is one of a disk spring, a coil spring, and a wave spring.

7. The electric linear motion actuator according to claim 3, wherein the elastic member is one of a disk spring, a coil spring, and a wave spring.

8. The electric linear motion actuator according to claim 4, wherein the elastic member is one of a disk spring, a coil spring, and a wave spring.

9. The electric linear motion actuator according to claim 1, wherein the helical rib and the circumferential grooves have V-shaped cross-sections.

10. The electric linear motion actuator according to claim 2, wherein the helical rib and the circumferential grooves have V-shaped cross-sections.

11. The electric linear motion actuator according to claim 3, wherein the helical rib and the circumferential grooves have V-shaped cross-sections.

12. The electric linear motion actuator according to claim 4, wherein the helical rib and the circumferential grooves have V-shaped cross-sections.

13. The electric linear motion actuator according to claim 6, wherein the helical rib and the circumferential grooves have V-shaped cross-sections.

14. An electric disk brake system comprising a brake disk, a brake pad, and an electric linear motion actuator for linearly driving the brake pad and pressing the brake pad against the brake disk, thereby generating a brake force,
wherein the electric linear motion actuator is the electric linear motion actuator of claim 1.

15. An electric disk brake system comprising a brake disk, a brake pad, and an electric linear motion actuator for linearly driving the brake pad and pressing the brake pad against the brake disk, thereby generating a brake force,
wherein the electric linear motion actuator is the electric linear motion actuator of claim 2.

16. An electric disk brake system comprising a brake disk, a brake pad, and an electric linear motion actuator for linearly driving the brake pad and pressing the brake pad against the brake disk, thereby generating a brake force,
wherein the electric linear motion actuator is the electric linear motion actuator of claim 3.

17. An electric disk brake system comprising a brake disk, a brake pad, and an electric linear motion actuator for linearly driving the brake pad and pressing the brake pad against the brake disk, thereby generating a brake force,
wherein the electric linear motion actuator is the electric linear motion actuator of claim 4.

18. An electric disk brake system comprising a brake disk, a brake pad, and an electric linear motion actuator for linearly driving the brake pad and pressing the brake pad against the brake disk, thereby generating a brake force,
wherein the electric linear motion actuator is the electric linear motion actuator of claim 6.

19. An electric disk brake system comprising a brake disk, a brake pad, and an electric linear motion actuator for linearly driving the brake pad and pressing the brake pad against the brake disk, thereby generating a brake force,
wherein the electric linear motion actuator is the electric linear motion actuator of claim 9.

* * * * *